United States Patent [19]

Dickol et al.

[11] Patent Number: 5,875,336
[45] Date of Patent: Feb. 23, 1999

[54] METHOD AND SYSTEM FOR TRANSLATING A NON-NATIVE BYTECODE TO A SET OF CODES NATIVE TO A PROCESSOR WITHIN A COMPUTER SYSTEM

[75] Inventors: John Edward Dickol; Bernard Charles Drerup, both of Austin; James Michael Stafford, Round Rock; Wendel Glenn Voigt, Pflugerville, all of Tex.

[73] Assignee: International Business Machines Corporation, Armonk, N.Y.

[21] Appl. No.: 829,022

[22] Filed: Mar. 31, 1997

[51] Int. Cl.⁶ .................................................... G06F 9/455
[52] U.S. Cl. ........................................ 395/705; 395/568
[58] Field of Search .................................... 395/568, 705

[56] References Cited

U.S. PATENT DOCUMENTS

| | | | |
|---|---|---|---|
| 3,955,180 | 5/1976 | Hirtle | 340/172.5 |
| 3,997,895 | 12/1976 | Cassonnet et al. | 340/172.5 |
| 4,315,321 | 2/1982 | Parks, III et al. | 364/900 |
| 4,434,462 | 2/1984 | Guttag et al. | 364/200 |
| 4,450,519 | 5/1984 | Guttag et al. | 364/200 |
| 4,587,612 | 5/1986 | Fisk et al. | 364/200 |
| 4,763,255 | 8/1988 | Hopkins et al. | 364/300 |
| 4,791,558 | 12/1988 | Chaitin et al. | 364/200 |
| 4,901,233 | 2/1990 | Liptay | 364/200 |
| 4,961,141 | 10/1990 | Hopkins et al. | 364/200 |
| 5,043,870 | 8/1991 | Ditzel et al. | 364/200 |
| 5,142,681 | 8/1992 | Driscoll et al. | 395/700 |
| 5,241,679 | 8/1993 | Nakagawa et al. | 395/725 |
| 5,274,831 | 12/1993 | Katsuta | 395/800 |
| 5,301,198 | 4/1994 | Kawasaki | 371/19 |
| 5,355,460 | 10/1994 | Eickemeyer et al. | 395/375 |
| 5,388,235 | 2/1995 | Ikenaga et al. | 395/375 |
| 5,481,684 | 1/1996 | Richter et al. | 395/375 |
| 5,481,693 | 1/1996 | Blomgren et al. | 395/375 |
| 5,490,256 | 2/1996 | Mooney et al. | 395/375 |
| 5,542,059 | 7/1996 | Blomgren | 395/375 |
| 5,546,552 | 8/1996 | Coon et al. | 395/375 |
| 5,560,013 | 9/1996 | Scalzi et al. | 395/700 |
| 5,564,031 | 10/1996 | Amerson et al. | 395/419 |
| 5,574,927 | 11/1996 | Scantlin | 395/800 |
| 5,598,560 | 1/1997 | Benson | 395/707 |
| 5,754,830 | 5/1998 | Butts et al. | 395/500 |
| 5,794,049 | 8/1998 | Lindholm | 395/706 |
| 5,805,895 | 9/1998 | Breternitz et al. | 395/709 |

Primary Examiner—David Y. Eng
Attorney, Agent, or Firm—Casimer K. Salys; Anthony P. Ng; Andrew J. Dillon

[57] ABSTRACT

A method and system for translating a non-native bytecode to a set of codes native to a processor within a computer system is disclosed. In accordance with the method and system of the present invention, a computer system capable of translating non-native instructions to a set of native instructions is provided that comprises a system memory, a processor, and an instruction set convertor. The system memory is utilized to store non-native instructions and groups of unrelated native instructions. The processor is only capable of processing native instructions. The instruction set convertor, coupled between the system memory and the processor, includes a semantics table and an information table. In response to an instruction fetch from the processor for a non-native instruction in the system memory, the instruction set convertor translates the non-native instruction to a set of native instructions for the processor by accessing both the semantics table and the information table.

16 Claims, 5 Drawing Sheets

METHOD AND SYSTEM FOR TRANSLATING A NON-NATIVE BYTECODE TO A SET OF CODES NATIVE TO A PROCESSOR WITHIN A COMPUTER SYSTEM

BACKGROUND OF THE INVENTION

1. Technical Field

The present invention relates to a method and system for data processing in general and, in particular, to a method and system for processing non-native instructions within a computer system. Still more particularly, the present invention relates to an improved method and system for translating non-native instructions to instructions native to a processor within a computer system.

2. Description of the Prior Art

The World Wide Web, or as it is simply known, the "Web," has dramatically changed the online world and continues to grow in popularity. As a communications system, the Web allows information providers to distribute and collect information globally arid instantly. For users, the Web is a dynamic view into the works and ideas of millions of people worldwide. Through a system of hypertext, users of the Web are able to select and view information from all over the Web. While the hypertext system gives Web users a high degree of selectivity over the information they choose to view, their level of interactivity with that information is low. Even with improvements such as hypermedia, which opens up many new kinds of sensory input for the Web users, including access to graphics and videos, the Web itself still lacks a true interactivity— the kind of real-time, dynamic, and visual interaction between Web users and applications.

Java[1] brings this missing interactivity to the Web. With Java, animations and interactive applications on the Web become feasible. Java's features enrich communication, information, and interaction on the Web by enabling the distribution of executable content—rather than just Hypertext Markup Language (HTML) pages and hypermedia files—among Web users. This ability to distribute executable content is one of the powerful features of Java.

[1] Java is a trademark of Sun Microsystems, and is also the name of a programming language developed by Sun Microsystems.

In order to view and interact with the animation and the interactive applications on the Web, a Web user must have a computer installed with a Java-enabled Web browser. Even so, because Java has an instruction set that is different from the instruction set of most, if not all, processors utilized within a Web user's personal computer, Java instructions typically cannot be executed in theirs original bytecode form. Hence, some form of translation from the Java instruction set to an instruction set associated with the processor within the personal computer is required. Conventionally, an instruction set associated with a particular processor is called a "native" instruction set to that computer, while an instruction set that is not specifically developed for that particular processor is called a "non-native" instruction set to that particular computer. In this case, Java would be a non-native instruction set with respective to the Web user's computer.

There are two commonly used methods to execute a non-native instruction set within a computer. The first method is to utilize a software interpreter. This method is very easy to implement, but it has poor performance due to the large amount of overhead that the software interpreter requires for the execution of each non-native instruction. The second method is to compile the program that is in non-native instructions to a set of native instructions. However, this method requires a large amount of memory for storing the compiler as well as the output of the compiler. Furthermore, if the application is not available until it is invoked, the initial compilation time may add a significant delay before the execution even begins. Hence, both of these methods inevitably result in performance degradation.

A better method would require a hardware element that translates non-native instructions to native instructions in "real time." The term "real time" in this case means that the native instructions are generated from the non-native instructions as soon as the processor within the computer attempts to perform an instruction fetch from a system memory. The present disclosure describes such a hardware element for efficiently performing the translation of non-native Java instructions to instructions that are native to the processor within the computer.

SUMMARY OF THE INVENTION

In view of the foregoing, it is therefore an object of the present invention to provide an improved method and system for data processing.

It is another object of the present invention to provide an improved method and system for processing non-native instructions within a computer system.

It is yet another object of the present invention to provide an improved method and system for translating non-native instructions to instructions native to a processor within a computer system.

In accordance with the method and system of the present invention, a computer system capable of translating non-native instructions to a set of native instructions is provided that comprises a system memory, a processor, and an instruction set convertor. The system memory is utilized to store non-native instructions and groups of unrelated native instructions. The processor is only capable of processing native instructions. The instruction set convertor, coupled between the system memory and the processor, includes a semantics table and an information table. In response to an instruction fetch from the processor for a non-native instruction in the system memory, the instruction set convertor translates the non-native instruction to a set of native instructions for the processor by accessing both the semantics table and the information table.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be executed in a variety of computers under a number of different operating systems. The computer may be, for example, a personal computer, a midrange computer or a mainframe computer. In addition, the computer may be part of a network such as a local-area network (LAN) or a wide-area network (WAN). For the purpose of illustration, a preferred embodiment of the present invention, as described below, is implemented on a computer system having a PowerPC™ processor manufactured by International Business Machines Corporation.

Figure 1:
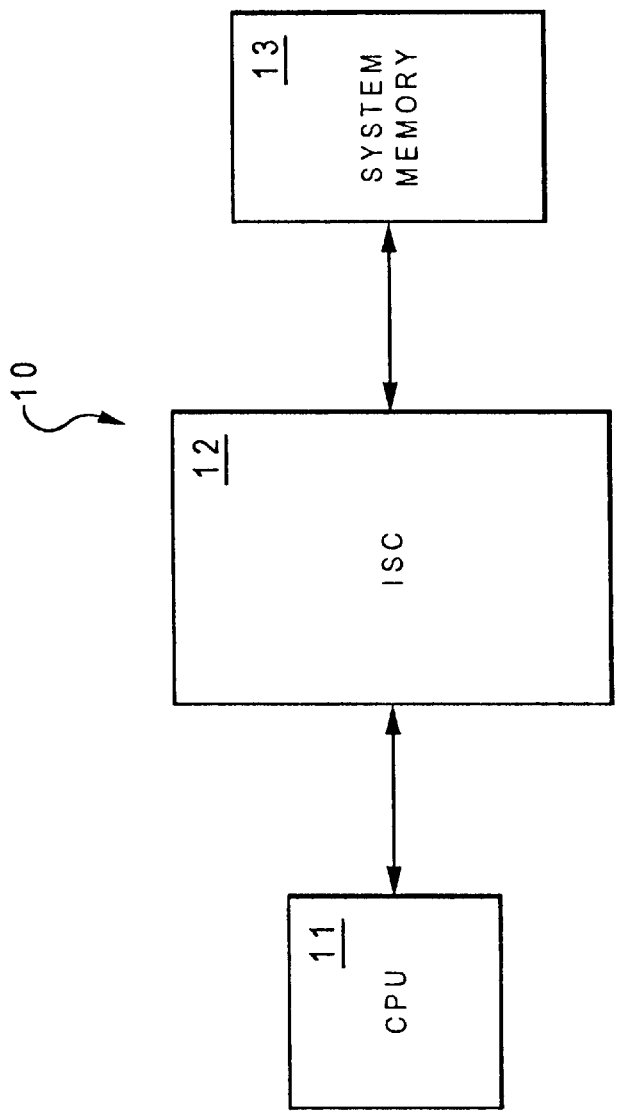
FIG. 1 is a block diagram of a system configuration that may be utilized by a preferred embodiment of the invention.

Referring now to the drawings and in particular to FIG. 1, there is depicted a block diagram of a system configuration that may be utilized by a preferred embodiment of the present invention. System configuration 10 includes a central processing unit (CPU) 11, an instruction set convertor (ISC) 12, and a system memory 13. As shown, ISC 12 is coupled between CPU 11 and system memory 13. Java programs consist of compiled Java instructions, are stored in system memory 13. When CPU 11 is performing an instruction fetch in system memory 13, ISC 12 determines what type of instruction CPU 11 is fetching. If the fetch is for a native instruction, then ISC 12 passes the fetch directly to system memory 13. However, if the fetch is for a non-native Java instruction, then ISC 12 performs the following steps:

a. intercepting the instruction fetch before it reaches system memory 13;

b. fetching corresponding Java instruction from system memory 13;

c. translating the Java instruction to PowerPC™ instruction(s);

d. returning the PowerPC™ instruction(s) to CPU 11.

The PowerPC™ instruction(s) from the translation is only passed to CPU 11 and is not stored anywhere in system memory 13.

Figure 2:
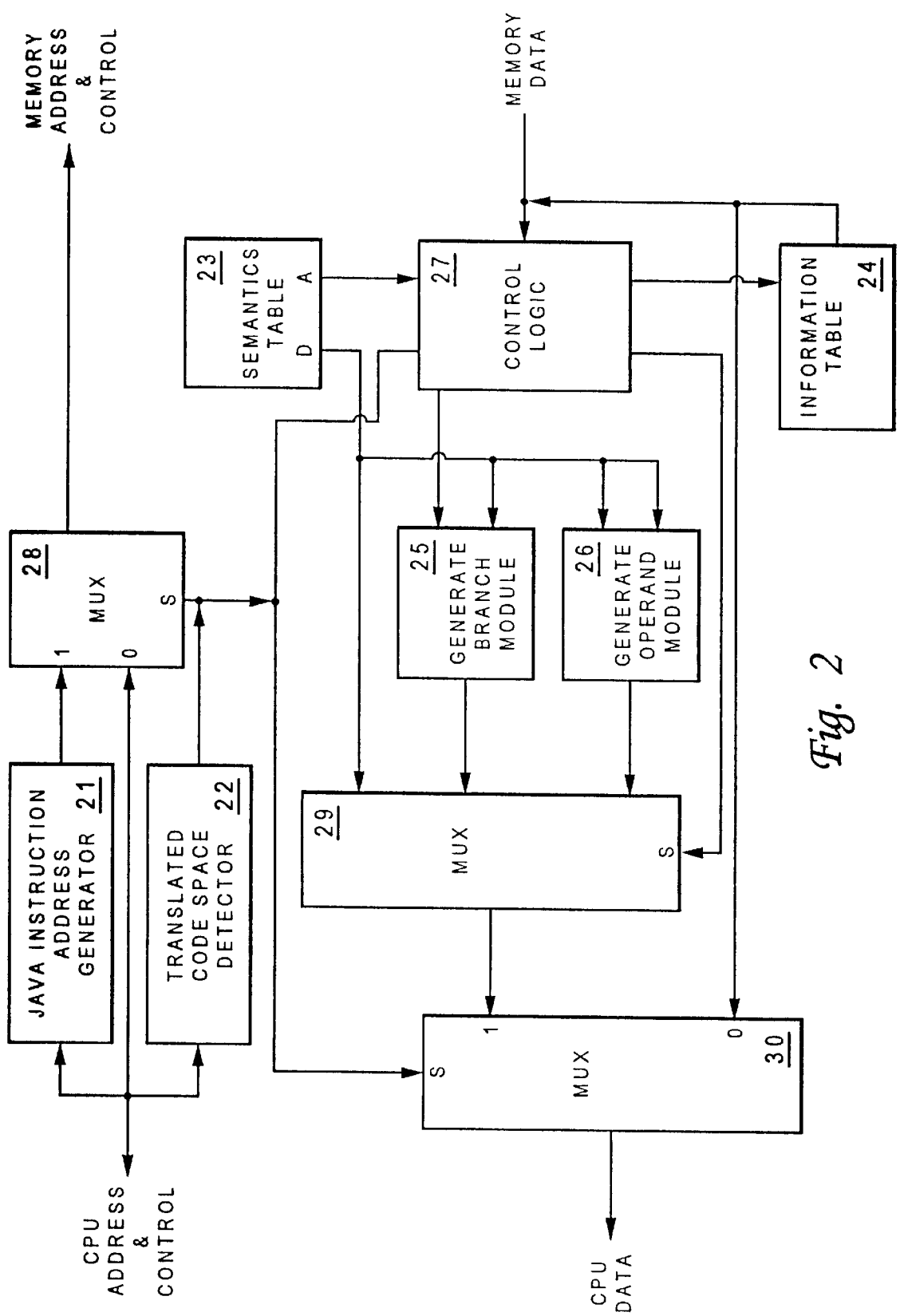
FIG. 2 is a detailed block diagram of the instruction set convertor of FIG. 1.

With reference now to FIG. 2, there is illustrated a detailed block diagram of the ISC in FIG. 1. During initialization, a segment of address space in CPU 11 is selected for the execution of Java programs as a "translated code space," and ISC 12 is informed of the location of this translated code space. An instruction fetch from CPU 11 is received by both Java Instruction Address Generator 21 and Translated Code Space Detector 22. By comparing the address of an instruction fetch to the translated code space, ISC 12 can determine whether the instruction fetch is for a native instruction or for a non-native Java instruction. If the instruction fetch is for a Java instruction, the fetch will be sent to system memory 13. System memory 13 then returns data back to control logic 27. Semantics Table 23 and Information Table 24 are then accessed for the translation of the non-native Java instruction to an instruction that is native to CPU 11. For certain Java instructions, Generate Branch Module 25 and Generate Operand Module 26 will also be assessed during the translation process. The translated instruction will be sent to CPU 11 via multiplexers 29 and 30.

Semantics Table 23 contains several sets of entries, each associated with one Java instruction. Each set of entries may include up to eight PowerPC™ instructions that direct CPU 11 to perform a set of operations required by a particular Java instruction. As a preferred embodiment of the present invention, Semantics Table 23 can store up to eight PowerPC™ instructions for each of the 256 possible Java opcodes. Thus, the total table size of Semantics Table 23 is 8 K bytes (8 instructions * 4 bytes/instruction * 256 opcodes). When a Java instruction requires fewer than eight PowerPC™ instructions, the remaining entries in Semantics Table 23 will be left unutilized.

Similarly, information Table 24 contains several sets of entries, each associated with one Java instruction. Each set of entries comprises a three-bit Java-Length field, a three-bit PowerPC™-Length field, and an eight-bit Generate-Branch field. The Java-Length field indicates the length of a Java instruction. Possible lengths for a Java instruction are one, two, three, four, or five bytes and variable lengths. The PowerPC™-Length field indicates how many of the eight PowerPC™ instructions are utilized in a corresponding entry in Semantics Table 23. Each bit of the Generate-Branch field corresponds to a PowerPC™ instruction in Semantics Table 23 and indicates if that PowerPC™ instruction is a branch instruction that requires the generation of a branch offset.

As a preferred embodiment of the present invention, there are four different ways of translating Java instructions to PowerPC™ instructions by ISC 12, each according to the type of Java instructions being fetched. The four types of Java instructions are: 1. simple one-byte instructions; 2. simple multi-byte instructions; 3. complex instructions; and, 4. branch instructions.

I. SIMPLE ONE-BYTE JAVA INSTRUCTIONS

The first type of Java instructions is that which has no operands and indicates a set of operations that can be accomplished by a simple set of PowerPC™ instructions. This type of Java instructions includes:

basic loads and stores (such as ICONST_0, LLOAD_0, FSTORE_0, etc.) mathematical or logical operations (such as FADD, IMUL, IXOR, etc.)

For this type of Java instructions, the corresponding set of entries in Semantics Table 23 contains actual PowerPC™ instructions. When CPU 11 makes an instruction fetch for one of this type of Java instructions, ISC 12 passes the corresponding PowerPC™ instructions directly from Semantics Table 23 to CPU 11.

Referring now to Table 1, there are depicted two examples of translating a simple one-byte Java instruction to its corresponding PowerPC™ instructions, according to a preferred embodiment of the present instruction. In the first example, the Java instruction ICONST_1 pushes an integer constant "1" into an operand stack (the operand stack is pointed to by a register OPTOP). In the second example, the Java instruction ISTORE_2 loads an integer from the operand stack and stores it into a local variable table (the local variable table is pointed to by a register VARS).

TABLE 1

| Java Instruction | Set of PowerPC ™ Instructions | | Comments |
|---|---|---|---|
| ICONST_1 | li | r3, 1 | ;r3 = 1 |
|  | stwu | r3, 4 (OPTOP) | ;top of stack = r3 |
| ISTORE_2 | lwz | r3, (OPTOP) | ;r3 = top of stack |
|  | addi | OPTOP, OPTOP, −4 | ;decrement OPTOP |
|  | stw | r3, 8 (VARS) | ;local var #2 = r3 |

II. SIMPLE MULTI-BYTE JAVA INSTRUCTIONS

The second type of Java instructions is that which has one or more operands but still can be accomplished by a small set of PowerPC™ instructions. This type of instructions includes:

memory loads and stores (such as ILOAD, FSTORE, etc.)

stack push operations (such as BIPUSH and SIPUSH)

For this type of Java instructions, the first PowerPC™ instruction in the corresponding set of entries in Semantics Table 23 is a "load immediate" (li) instruction. Generate Operand Module 26 generates this "load immediate" instruction by combining the opcode from the entry in Semantics Table 23 with the operand from the Java instruction. Control Logic 27 knows how many operands (and li instructions) are required according to the Java-Length field in information Table 24. The remaining entries in Semantics Table 23 contain actual PowerPC™ instructions for the corresponding Java instruction.

With reference now to Table 2, there are depicted two examples of translating a simple multi-byte Java instruction to its corresponding PowerPC™ instructions, according to a preferred embodiment of the present instruction. In the first example, the Java instruction BIPUSH has a one-byte operand that is pushed onto the operand stack. In the second example, the Java instruction SIPUSH has two bytes of operands joined together to form a 16-bit integer, which is then pushed into the operand stack. (The | symbol is utilized to specify concatenation.)

TABLE 2

| Java Instruction | Set of PowerPC ™ Instructions | | Comments |
|---|---|---|---|
| BIPUSH op1 | li | r3, op1 | ;r3 = op1 |
| | stwu | r3, 4 (OPTOP) | ;top of stack = r3 |
| SIPUSH op1, op2 | li | r3, op2 \| op1 | ;r3 = op2 \| op1 |
| | stwu | r3, 4 (OPTOP) | ;top of stack = r3 |

Ill. COMPLEX JAVA INSTRUCTIONS

The third type of Java instruction is that which indicates a complex set of operations requiring numerous PowerPC™ instructions. This type of Java instructions includes:

constant pool access (such as LDC1, LDC2W, etc.)

memory allocation (such as NEW, NEWARRAY, etc.)

method invocations (such as INVOKEVIRTUAL, INVOKESTATIC, etc.)

For this type of Java instruction, the corresponding set of entries in Semantics Table 23 comprises a subroutine call to an appropriate native subroutine. Each native subroutine is a set of PowerPC™ instructions stored within the system memory at a location outside the translated code space.

Referring now to Table 3, there are depicted two examples of translating a complex Java instruction to its corresponding PowerPC™ instructions, according to a preferred embodiment of the present instruction. The first example shows Java instruction LDC_1 is implemented by calling a first native subroutine "N ⎺LDC_1" while the second example shows Java instruction INVOKESTATIC is implemented by calling a second native subroutine "N_INVOKESTATIC." As shown, LDC1 has one operand and INVOKESTATIC has two operands.

TABLE 3

| Java Instruction | Set of PowerPC ™ Instructions | | Comments |
|---|---|---|---|
| LCD_1 | li | r3, op1 | ;r3 = op1 |
| | bla | N_LCD_1 | ;call native subroutine |
| INVOKESTATIC | li | r3, op2 \| op1 | ;r3 = op2 \| op1 |
| | bla | N_INVOKESTATIC | ;call native subroutine |

IV. JAVA BRANCH INSTRUCTIONS

The fourth type of Java instructions consists of various branch instructions, including:

conditional branches (such as IFEQ, IF_ICMPGE, etc.)

unconditional branches (such as GOTO, JSR, etc.)

For this type of Java instructions, Semantics Table 23 contains the necessary PowerPC™ instructions to prepare for each branch, such as instructions to perform compare for conditional branches or instructions to push the return address on the stack for obtaining jump-subroutine instructions.

The last utilized entry in Semantics Table 23 is a PowerPC™ branch instruction. The offset of the PowerPC™ branch instruction is generated by ISC 12. A branch instruction that will be passed to CPU 11 is generated by combining the opcode from an entry in Semantics Table 23 with the branch offset generated by Generate Branch Module 25. The contents of the Generate-Branch field in Information Table 24 will indicate to control logic 27 when this offset generation should occur.

The following sections provide more specific details for performing an efficient translation of each of the above four types of Java instructions to instructions that are native to a PowerPC™ processor.

BRANCH OFFSET GENERATION

An "offset" of a branch instruction is the number of bytes between the address of a current instruction and the address of a destination instruction. All Java branch instructions have an operand that specifies an offset for the branch. However, after an Java instruction has been translated to PowerPC™ instructions, the original offset value is no longer correct. This is because the number of PowerPC™ instructions required to implement a given Java instruction varies. For example, a Java instruction that is one byte long may be translated to a set of PowerPC™ instructions that is 12 bytes long, while a Java instruction that is two bytes long may be translated to a set of PowerPC™ instructions that is only four bytes long.

Generally speaking, the only way to determine what the offset of a branch instruction is going to be after the translation is to examine every Java instruction between the current instruction and the destination instruction. Thus, the branch offset will be the sum total of the lengths of all corresponding PowerPC™ instructions for each of those Java instructions. Obviously, when there is a large number of Java instructions that need to be examined, this process will become very slow and may result in a terrible performance degradation.

To resolve this problem, ISC 12 utilizes a constant-size translation scheme. Specifically, every byte of Java code is translated to a fixed-size block of PowerPC™ code. In order to match with the size of a primary cache within all PowerPC™ processors, the block size is preferably 32 bytes, though other block sizes may also be utilized. There are eight entries within a block for storing eight separate PowerPC™ instructions. This scheme makes it easy to calculate the branch offsets after conversion. For example, if the offset for a Java instruction is 4 bytes, then the offset for the corresponding PowerPC™ instructions is 4 * 32 =128 bytes. If the PowerPC™ branch instruction is not the first instruction of the current block, then a value must be subtracted from this offset for compensation. Thus, the offset of each PowerPC™ branch instruction can be calculated simply by multiplying the Java branch offset by 32 with an addition of any necessary compensation.

CONSTANT-SIZE TRANSLATION HANDLING

Because each byte of Java code is mapped to a 32-byte block of the CPU address space, some Java instructions that are one byte in length may be translated simply by passing the eight PowerPC™ instructions, all 32 bytes in size, from Semantics Table 23 to CPU 11, as mentioned previously. Because most Java instructions will be translated to PowerPC™ instructions that are smaller than the allotted space, the simplest way of handling this would be to pad each of the remaining spaces with a NOP PowerPC™ instruction. This is no doubt a waste of cache memory space within CPU 11, and better ways for utilizing such spaces will be described infra.

LOCATING JAVA INSTRUCTIONS

A segment of system memory may be selected for holding Java instructions during the initialization phase. This segment is different from the "translated code space" described above. These two spaces are not equal because the translated code space is 32 times larger than the Java code's memory space. During the initialization phase, ISC 12 is informed of the starting address of the Java code's memory space.

When CPU 11 performs an instruction fetch within the translated code space (and thus associated with a Java program), Java instruction Address Generator 21 determines at which location in system memory 13 the corresponding Java instructions can be fetched, by utilizing the following formula:

$$\text{Address}_{Java} = \frac{\text{Address}_{CPU} - \text{Address}_{code}}{32} + \text{Address}_{memory}$$

where:
    Address Java = address of Java instruction
    Address CPU = address of the instruction fetch
    Address code = starting address of translated code space
    Address memory = starting address of Java memory space In the translated code space, only the blocks that correspond to an opcode are actually utilized, while blocks that correspond to the operands of Java instruction are unutilized. Thus, for each Java instruction, regardless of length, only one block of translated code space is utilized. To accomplish this, the last instruction of a given block of translated code for any multi-byte Java instruction is a branch to the block corresponding to the next Java instruction. Generate Branch Module 25 generates this branch instruction. This is done for two reasons. The first reason is to ensure that all instruction fetches can be directly mapped to the start of a Java instruction. This is necessary because Java instructions have variable lengths, and an instruction fetch that maps to a Java operand cannot be translated when the opcode cannot be located. The second reason is to allow Semantics Table 23 to have a fixed eight entries per Java instruction, regardless of the length of a Java instruction.

Figure 3:
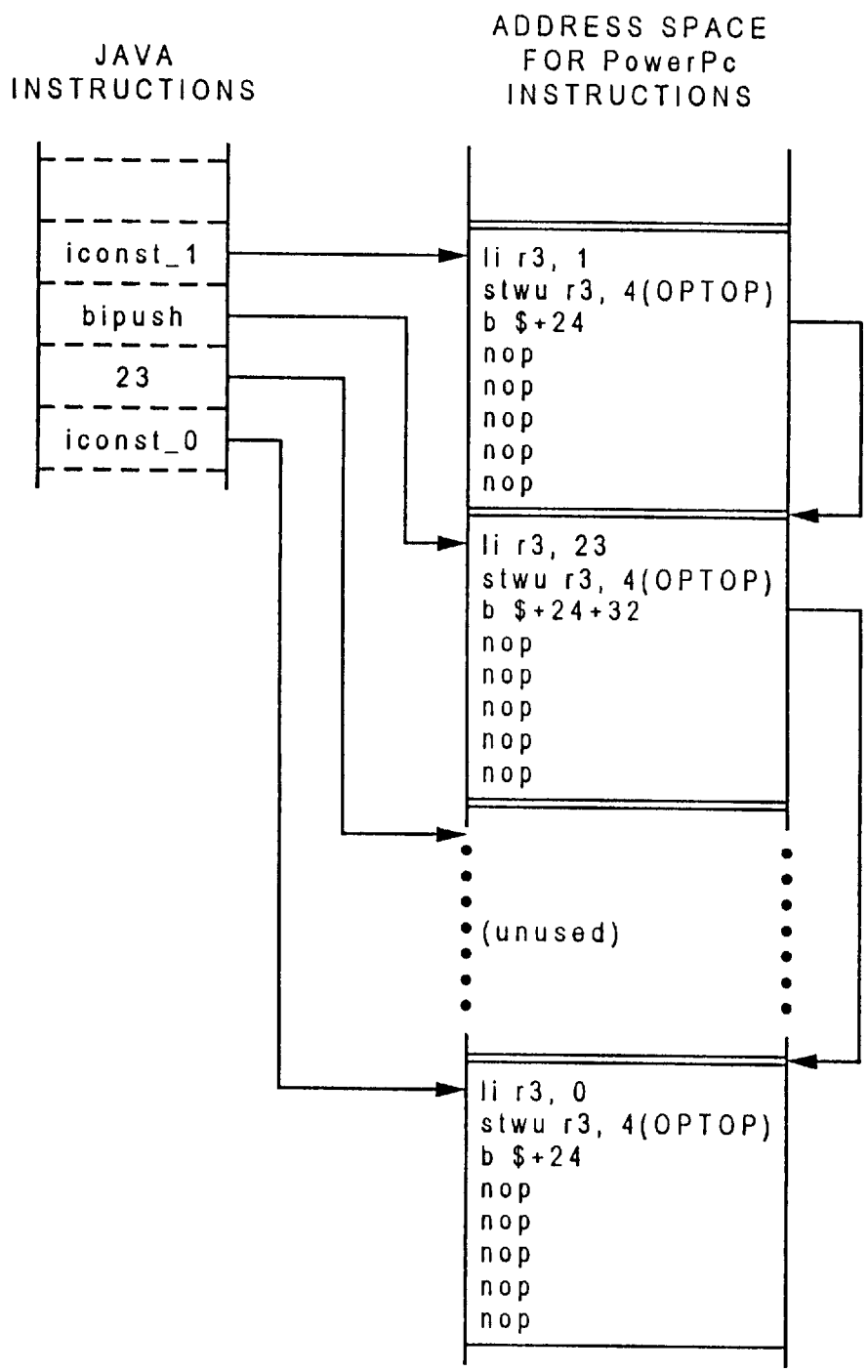
FIG. 3 is an example of locating Java instructions in accordance with a preferred embodiment of the present invention.

Referring now to FIG. 3, there is illustrated an example of locating Java instructions in accordance with a preferred embodiment of the present invention. In this example, only three Java instructions are shown. Note that the branch instruction in the translated PowerPC™ segment skips the unused block that corresponds to the operand of the Java BIPUSH instruction.

PACKING MULTIPLE JAVA INSTRUCTIONS PER BLOCK

As mentioned earlier, many Java instructions can be translated into fewer than eight PowerPC™ instructions; and if the remaining entries within the block are left unutilized, a large portion of the primary cache in CPU 11 is wasted. As a preferred embodiment of the present invention, this "abandoned" memory space can be utilized by allowing the translated code of as many Java instructions as possible to be packed into a single block. To do this, ISC 12 continues to translate Java instructions for a current block until no more Java instructions can fit. The last PowerPC™ instruction of the block is a branch to the block corresponding to the next Java instruction. Note that the offset of this branch must account for all of the Java instructions included in the current block. Specifically, the blocks that map directly to the additional Java instructions that are added to the current block are skipped over and unutilized.

Figure 4:
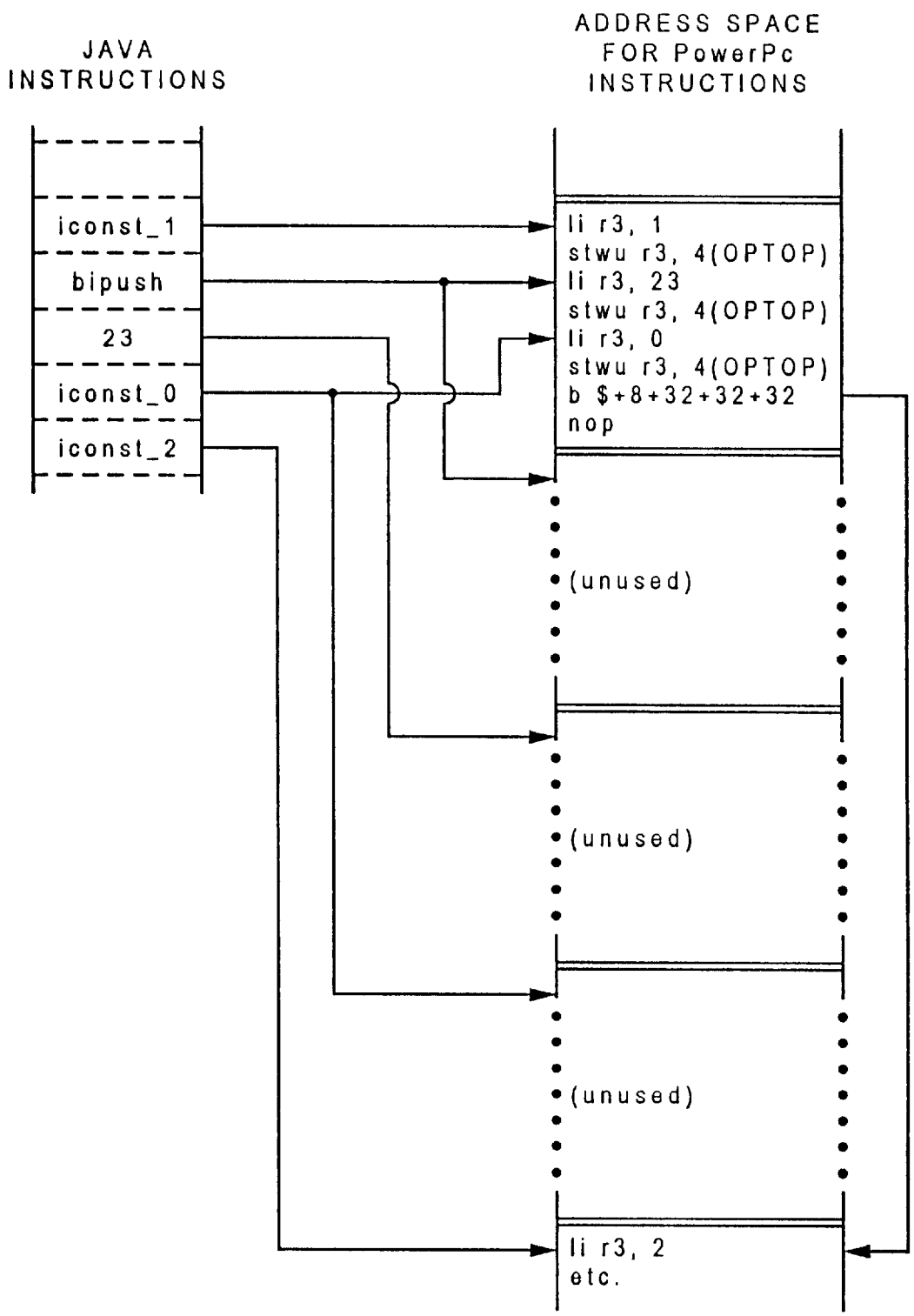
FIG. 4 is an example of packing multiple Java instructions per block, according to a preferred embodiment of the present invention.

With reference now to FIG. 4, there is depicted an example of packing multiple Java instructions per block, according to a preferred embodiment of the invention. While generating the translated code for the block corresponding to the ICONST_1 instruction, ISC 12 continues to generate the code for the BIPUSH and the ICONST_0 instructions to be fitted in the same block as the ICONST_1 instruction. Because the ICONST_2 instruction does not fit in the block corresponding to the ICONST_1 instruction, ICONST_2 instruction is not added to that block in order to save room for the required branch. Finally, the branch to the block corresponding to the ICONST_2 instruction is generated. In this case, only one entry in the block corresponding to the ICONST_1 instruction is wasted (i.e., the NOP instruction).

In order for this method to work properly, Java branch instructions that are added to the current block must modify the computation of the offset to compensate for the difference between the address of the current block and the address of the block that maps directly to the Java branch instruction.

This method has one peculiarity. Because the target of branch instructions is always the first element of a block, it is possible for a Java instruction to be instantiated into more than one block. This occurs when a given Java instruction is added to a block due to packing it in with a preceding Java instruction (the given Java instruction is added to a block that corresponds to some preceding instruction), and the given Java instruction is the destination of a Java branch instruction (the given Java instruction is the first in the block that maps directly from that given Java instruction).

Figure 5:
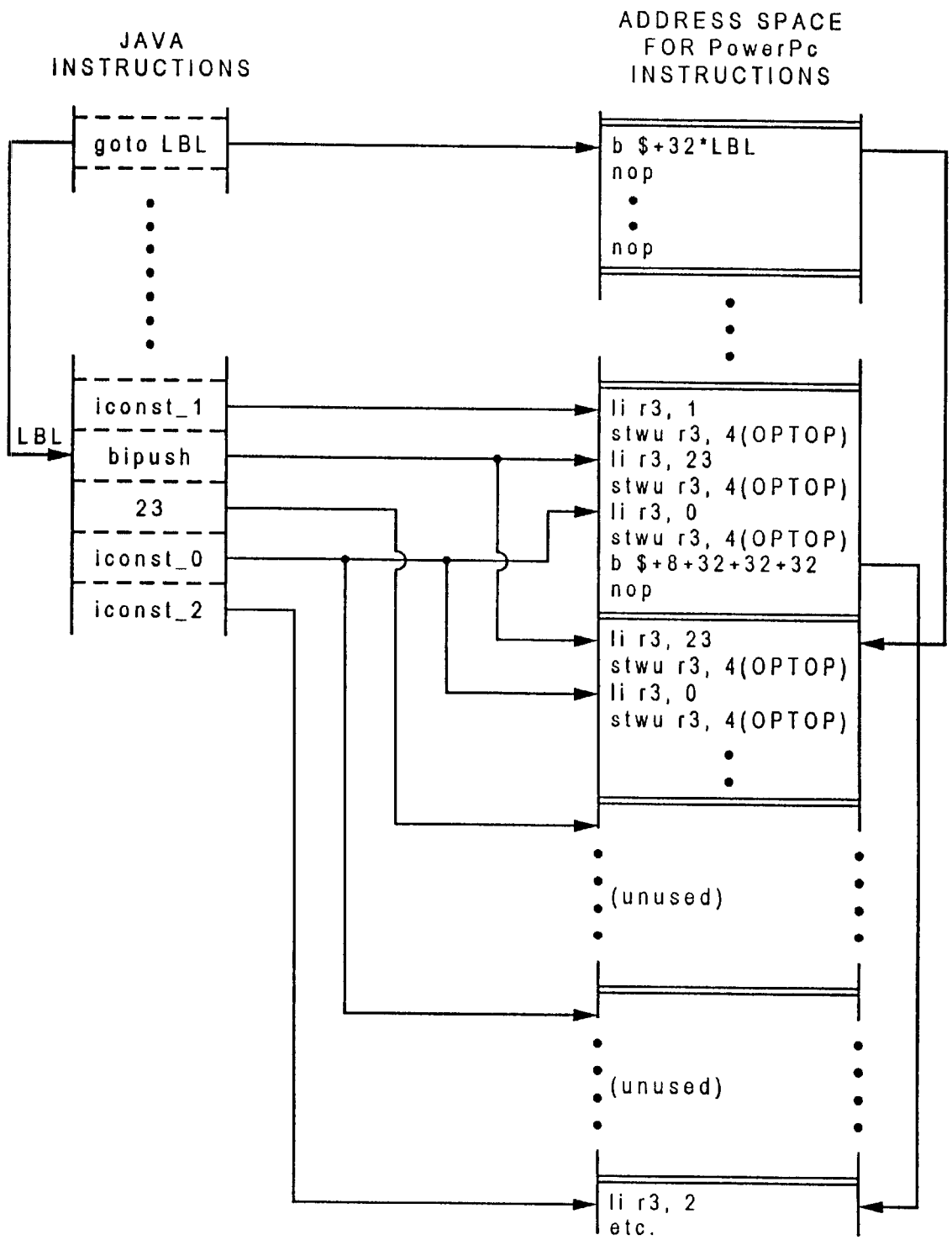
FIG. 5 is an example of a Java instruction instantiated into more than one block.

As long as the code generated in both places is identical, it does not matter which instantiation is executed by CPU 11. The program will execute properly regardless. FIG. 5 illustrates this situation. If CPU 11 performs an instruction fetch corresponding to the ICONST_1 instruction, then ISC 12 generates a block of PowerPC™ instruction that includes the ICONST_1 instruction as well as the BIPUSH and ICONST_0 instructions. However, due to a Java branch instruction (i.e., the GOTO instruction), CPU 11 can also issue an instruction fetch that corresponds directly to the BIPUSH instruction. In this case, ISC 12 generates a block of PowerPC™ instruction beginning with the BIPUSH instruction. In either case, the same PowerPC™ instructions are executed for the BIPUSH instruction.

As has been described, the present invention provides an improved method and system for translating a non-native Java bytecode to a code that is native to a processor within a computer system. Although a PowerPC™ processor is utilized to illustrate the present invention, any other processor such as an 80×86 or Pentium-based processor manufactured by Intel Corporation may also be applicable.

While the invention has been particularly shown and described with reference to a preferred embodiment, it will be understood by those skilled in the art that various changes in form and detail may be made therein without departing from the spirit and scope of the invention.

What is claimed is:

1. A computer system capable of translating a plurality of non-native instructions to a plurality of native instructions, said computer system comprising:

a system memory for storing said non-native instruction and an unrelated set of plurality of native instructions;

a processor for processing said plurality of native instructions;

an instruction set convertor coupled between said system memory and said processor, said instruction set convertor comprising:
a semantics table,
an information table,
a generate branch module,
a generate operand module; and an instruction set translator for translating said non-native instruction to said plurality of native instructions for said processor by accessing said semantics table and said information table in conjunction with said generate branch module and said generate operand module, in response to an instruction fetch from said processor for said non-native instruction in said system memory.

2. The computer system capable of translating a plurality of non-native instructions to a plurality of native instructions according to claim 1, wherein said semantics table further includes a plurality of sets of entries, wherein each of said plurality of sets of entries contains a plurality of native instructions that correspond to a non-native instruction.

3. The computer system capable of translating a plurality of non-native instructions to a plurality of native instructions according to claim 1, wherein said information table further comprises a first field for indicating a length of said non-native instruction, a second field for indicating a length of said native instructions, and a third field for indicating whether or not a native instruction in said semantic table is a branch instruction.

4. The computer system capable of translating a plurality of non-native instructions to a plurality of native instructions according to claim 1, wherein said instruction set convertor further includes a means for passing said plurality of native instructions directly from said semantics table to said processor when said instruction fetch is for a simple one-byte non-native instruction.

5. The computer system capable of translating a plurality of non-native instructions to a plurality of native instructions according to claim 1, wherein said instruction set convertor further includes a means for passing a native load immediate instruction to said processor when said instruction fetch is for a simple multi-byte non-native instruction, wherein said native load immediate instruction is generated by combining an opcode from an entry in said semantic table with an operand from said non-native instruction, within said generate operand module.

6. The computer system capable of translating a plurality of non-native instructions to a plurality of native instructions according to claim 1, wherein said instruction set convertor further includes a means for invoking a subroutine call to an appropriate native subroutine when said instruction fetch is for a complex non-native instruction.

7. The computer system capable of translating a plurality of non-native instructions to a plurality of native instructions according to claim 1, wherein said instruction set convertor further includes a means for passing a native branch instruction to said processor when said instruction fetch is for a non-native branch instruction, wherein said native branch instruction is generated by combining an opcode from an entry in said semantic table with an offset related to said non-native branch instruction, within said generate branch module.

8. The computer system capable of translating a plurality of non-native instructions to a plurality of native instructions according to claim 1, wherein said instruction set convertor further includes a means for packing more than one non-native instruction within a block of address space.

9. The computer system capable of translating a plurality of non-native instructions to a plurality of native instructions according to claim 1, wherein said instruction set convertor further includes a dividing means for dividing said plurality of native instructions into a plurality of fixed-size blocks, wherein each of said fixed-size blocks includes
a plurality of native instructions, and
a block-to-block branch native instruction,
wherein said block-to-block branch native instruction is generated by combining an opcode from said instruction set convertor with an offset related to a division from said dividing means, wherein said offset causes said processor to transfer control from a current subset of native instructions to a subsequent subset of native instructions.

10. A method for translating a plurality of non-native instructions to a plurality of native instructions within a computer system, wherein said computer system includes a processor and a system memory, said method comprising the steps of:

coupling an instruction set convertor between said system memory and said processor, said instruction set convertor comprising:
a semantics table,
an information table,
a generate branch module,
a generate operand module,
an instruction set translator, and accessing said semantics table and said information table in conjunction with said generate branch module and said generate operand module, in response to an instruction fetch from said processor for said non-native instruction in said system memory.

11. The method for translating a plurality of non-native instructions to a plurality of native instructions within computer system according to claim 10, wherein said method further includes a step of passing said plurality of native instructions directly from said semantics table to said processor when said instruction fetch is for a simple one-byte non-native instruction.

12. The method for translating a plurality of non-native instructions to a plurality of native instructions within computer system according to claim 10, wherein said method further includes a step of passing a native load immediate instruction to said processor when said instruction fetch is for a simple multi-byte non-native instruction, wherein said native load immediate instruction is generated by combining an opcode from an entry in said semantic table with an operand from said non-native instruction, within said generate operand module.

13. The method for translating a plurality of non-native instructions to a plurality of native instructions within computer system according to claim 10, wherein said method further includes a step of invoking a subroutine call to an appropriate native subroutine when said instruction fetch is for a complex non-native instruction.

14. The method for translating a plurality of non-native instructions to a plurality of native instructions within computer system according to claim 10, wherein said method further includes a step of passing a native branch instruction to said processor when said instruction fetch is for a non-native branch instruction, wherein said native branch instruction is generated by combining an opcode from an entry in said semantic table with an offset related to said non-native branch instruction, within said generate branch module.

15. The method for translating a plurality of non-native instructions to a plurality of native instructions within computer system according to claim 10, wherein said method further includes a step of packing more than one non-native instruction within a block of address space.

16. The method for translating a plurality of non-native instructions to a plurality of native instructions within computer system according to claim 10, wherein said method further includes a step of dividing said plurality of native instructions into a plurality of fixed-size blocks, wherein each of said fixed-size blocks includes a plurality of native instructions, and a block-to-block branch native instruction, wherein said block-to-block branch native instruction is generated by combining an opcode from said instruction set convertor with an offset related to said dividing step, wherein said offset causes said processor to transfer control from a current subset of native instructions to a subsequent subset of native instructions.

* * * * *